(12) United States Patent
Fukazawa et al.

(10) Patent No.: US 7,610,336 B2
(45) Date of Patent: *Oct. 27, 2009

(54) DATA ANALYSIS PROVIDER SYSTEM

(75) Inventors: Koshi Fukazawa, Nagoya (JP); Hideki Nogawa, Nagoya (JP); Kiyotaka Ohara, Nagoya (JP); Hideto Matsumoto, Nagoya (JP); Akihiro Furukawa, Nagoya (JP); Atsushi Kojima, Chita (JP); Masaaki Hibino, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/892,896

(22) Filed: Aug. 28, 2007

(65) Prior Publication Data

US 2008/0016154 A1  Jan. 17, 2008

Related U.S. Application Data

(63) Continuation of application No. 10/107,248, filed on Mar. 28, 2002, now Pat. No. 7,269,619.

(30) Foreign Application Priority Data

Mar. 30, 2001  (JP) .............................. 2001-101775

(51) Int. Cl.
*G06F 15/16* (2006.01)
(52) U.S. Cl. ........................ 709/203; 709/217; 358/1.15
(58) Field of Classification Search ......... 709/200–203, 709/217–227; 358/1.15, 1.13
See application file for complete search history.

(56) References Cited

U.S. PATENT DOCUMENTS 5,533,174 A * 7/1996 Flowers et al. ............. 358/1.15
5,659,795 A   8/1997 Duvall et al.

(Continued)

FOREIGN PATENT DOCUMENTS

JP   A-10-207710   8/1998

(Continued)

OTHER PUBLICATIONS

Kobayashi T., "Biz/PrintServer Ver. 2.0," Visual Basic Magazine, Japan, Shoeisha, Co., Ltd., Mar. 1, 2001, vol. 7, No. 4, pp. 196-199.

(Continued)

*Primary Examiner*—Moustafa M Meky
(74) *Attorney, Agent, or Firm*—Oliff & Berridge, PLC (57) ABSTRACT

A data analysis provider system includes a client device and a data analysis provider both capable of two-way transmission. The client device transmits either target-of-analysis data or information relating to the target-of-analysis data to the data analysis provider. Additionally, the client device notifies the data analysis provider of a desired process to be performed on the target-of-analysis data. The data analysis provider receives the target-of-analysis data or information relating to the target-of-analysis data transmitted from the client device and confirms the desired process. Then, the data analysis provider prepares response data that enables the client device to perform the desired process and transmits the response data to the client device. The client device receives the response data from the data analysis provider.

25 Claims, 8 Drawing Sheets

U.S. PATENT DOCUMENTS

| | | | |
|---|---|---|---|
| 5,848,415 A | 12/1998 | Guck | |
| 5,854,886 A * | 12/1998 | MacMillan et al. | 358/1.15 |
| 5,867,633 A | 2/1999 | Taylor, III et al. | |
| 6,003,069 A | 12/1999 | Cavill | |
| 6,012,083 A | 1/2000 | Savitzky et al. | |
| 6,201,611 B1 | 3/2001 | Carter et al. | |
| 6,341,307 B1 | 1/2002 | Lum et al. | |
| 6,549,301 B1 * | 4/2003 | Yasukawa | 358/1.2 |
| 6,615,297 B1 * | 9/2003 | Beard et al. | 710/62 |
| 6,618,162 B1 * | 9/2003 | Wiklof et al. | 358/1.15 |
| 6,850,337 B1 * | 2/2005 | Anderson et al. | 358/1.15 |
| 6,922,258 B2 * | 7/2005 | Pineau | 358/1.15 |
| 6,934,044 B1 | 8/2005 | Khandelwal | |
| 6,952,276 B2 * | 10/2005 | Sotokawa et al. | 358/1.15 |
| 7,062,579 B2 * | 6/2006 | Tateyama et al. | 710/104 |
| 7,075,670 B1 * | 7/2006 | Koga | 358/1.15 |
| 7,099,034 B2 * | 8/2006 | Anderson et al. | 358/1.15 |
| 7,265,867 B2 * | 9/2007 | Fu et al. | 358/1.18 |
| 2002/0018234 A1 | 2/2002 | Fu et al. | |
| 2002/0116439 A1 * | 8/2002 | Someshwar et al. | 709/104 |
| 2003/0158979 A1 * | 8/2003 | Tateyama et al. | 710/33 |
| 2005/0084314 A1 * | 4/2005 | Anderson et al. | 400/625 |

FOREIGN PATENT DOCUMENTS

| | | |
|---|---|---|
| JP | A 11-232365 | 8/1999 |
| JP | A-2000-165590 | 6/2000 |
| JP | A-2000-215123 | 8/2000 |
| JP | A-2000-357142 | 12/2000 |

OTHER PUBLICATIONS

Murah T., "Rich Text Converter 200, R2 Antenna House," PC User, Japan, Softbank Publishing Co., Ltd., Dec. 24, 1999, vol. 6, No. 22, p. 216.

"Microsoft Word Users Guide", 1991, pp. 453-455.

* cited by examiner

ENTIRE DOCUMENT OR DOCUMENT HEADER
FLAG FOR DISPLAYING OR PRINTING
COMPUTER CAPABILITIES
PRINTER MODEL

FIG.4

DOCUMENT HEADER FORMAT
DISPLAYING MODULE
PRINTING MODULE
RECOMMENDED COMPUTER REQUIREMENTS
DOCUMENT GENERALIZING DRIVER

FIG.5

WORD HEADER FORMAT
WORD DOCUMENT PRINTING MODULE
WORD DOCUMENT DISPLAYING MODULE
WORD-TO-HTML DOCUMENT CONVERTING DRIVER

EXCEL HEADER FORMAT
EXCEL DOCUMENT PRINTING MODULE
EXCEL DOCUMENT DISPLAYING MODULE
EXCEL-TO-HTML DOCUMENT CONVERTING DRIVER

PHOTOSHOP HEADER FORMAT
PHOTOSHOP DOCUMENT PRINTING MODULE
PHOTOSHOP DOCUMENT DISPLAYING MODULE
PHOTOSHOP-TO-HTML DOCUMENT CONVERTING DRIVER

FIG.6

HL-2400C DRIVER
HL-1670N DRIVER
MFC-8000 DRIVER
PM-820DC DRIVER
BJ-220 DRIVER

```
Sample.doc
PRINTING
486DX2 66MHz, 16Mbyte
HL-1670N
```

DATA ANALYSIS PROVIDER SYSTEM

This is a Continuation of application Ser. No. 10/107,248 filed Mar. 28, 2002, which claims the benefit of Japanese Patent Application No. 2001-101775 filed Mar. 30, 2001.

The disclosures of the prior applications are hereby incorporated by reference herein in their entirety.

BACKGROUND OF THE INVENTION

1. Field of the Invention

The present invention relates to a data analysis system with a provider that transmits response data in response to demands from a client device.

2. Description of the Related Art

Electronic mail (email) enables transmission of email messages over the Internet. Recent developments in email technology enable data prepared by any of a variety of application softwares to be attached to and transmitted with the email message.

For example, a document file that was prepared using a document making software can be attached to an email message. Even a large document file can be transmitted this way with much higher speed than a facsimile transmission. Also, because the document is received in the form of data and not hard copy, the document can be easily corrected or otherwise edited.

However, it is a problem when a person receives email messages attached with documents prepared using software that he or she does not have. In order to view or print such a document file, the receiver of the email message must install the appropriate application software in his or her computer. In this case, the memory of the computer hard disk is wastefully taken up by the application software, because the software will only be used for the purpose of displaying and printing the single document file. Also, this installing operation is troublesome.

Alternatively, the operator can transfer the document file to a computer that is installed with the appropriate application software. However, this transferring operation is troublesome and time-consuming, so it is difficult to view and to print the received document file promptly.

Further, when neither the receiver nor anybody around her or him owns the necessary application software, the receiver will be unable view or print the document.

Even if the same application software is installed in both sender and receiver computers, the receiver's computer may be unable to display or print documents with complicated composition when the receiver of the email uses a computer with lower capabilities than the computer used to prepare the document file.

SUMMARY OF THE INVENTION

It is an object of the present invention to solve the above-described problems and to provide a data analysis provider system, a data analysis provider, a data analysis method, and a data analysis program capable of easily and promptly performing processes for displaying and printing data easily and promptly, when necessary application software for displaying and printing data that a receiver has received is not available or a low-performance computer is used.

In order to achieve the above-described object, a data analysis provider system according to the present invention includes a client device and a data analysis provider both capable of two-way transmission. The client device includes a target-of-analysis information transmission unit, a desired process notification unit, and a response data reception unit. The target-of-analysis information transmission unit transmits at least one of target-of-analysis data and information relating to the target-of-analysis data to the data analysis provider. The desired process notification unit notifies the data analysis provider of a desired process to be performed on the target-of-analysis data. The response data reception unit receives response data from the data analysis provider.

The data analysis provider includes a target-of-analysis information reception unit, a desired process confirming unit, a response unit, and a response data transmission unit. The target-of-analysis information reception unit receives the at least one of the target-of-analysis data and information relating to the target-of-analysis data transmitted from the target-of-analysis information transmission unit of the client device. The desired process confirming unit confirms the desired process notified by the desired process notification unit of the client device. The response unit prepares response data that enables the client device to perform the desired process confirmed by the desired process confirming unit. The response data transmission unit transmits the response data to the client device.

A data analysis provider according to the present invention is capable of two-way transmission with a client device, and includes a target-of-analysis information reception unit, a desired process confirming unit, a response unit, and a response data transmission unit. The target-of-analysis information reception unit receives at least one of target-of-analysis data and information relating to the target-of-analysis data transmitted from the client device. The desired process confirming unit confirms a desired process notified by the client device. The response unit prepares response data that enables the client device to perform the desired process confirmed by the desired process confirming unit. The response data transmission unit transmits the response data to the client device.

A method according to the present invention for analyzing target-of-analysis data in a client device of a system including the client device and a data analysis provider, includes transmitting at least one of the target-of-analysis data and information relating to the target-of-analysis data to the data analysis provider; notifying the data analysis provider of a desired process to be performed on the target-of-analysis data; and receiving, from the data analysis provider, response data that the data analysis provider prepared to enable the client device to perform the desired process notified in the notifying step.

A method according to the present invention for analyzing target-of-analysis data in a terminal of a system including the terminal and a host includes transmitting at least one of the target-of-analysis data and information relating to the target-of-analysis data to the host; notifying the host of a desired process to be performed on the target-of-analysis data; and receiving, from the host, response data that the host prepared to enable the terminal to perform the desired process notified in the notifying step.

A computer program or a recording medium storing the program according to the present invention for analyzing target-of-analysis data in a terminal of a system including the terminal and a host includes a step of transmitting at least one of the target-of-analysis data and information relating to the target-of-analysis data to the host; a step of notifying the host of a desired process to be performed on the target-of-analysis data; and a step of receiving, from the host, response data that the host prepared to enable the terminal to perform the desired process notified in the notifying step.

A computer program or a recording medium storing the program according to the present invention for analyzing target-of-analysis data at a host of a system including a terminal and the host includes a step of receiving, at the host, at least one of the target-of-analysis data and information relating to the target-of-analysis data; a step of receiving, at the host, notification of a desired process to be performed on the target-of-analysis data at the terminal; and a step of transmitting, from the host, response data that the host prepared to enable the terminal to perform the desired process notified in the notifying step.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE EMBODIMENT

An embodiment of the present invention will be described while referring to the accompanying drawings. The embodiment describes the present invention applied to a print service provider (host) that performs analyses relating to printing and displaying documents.

Figure 1:
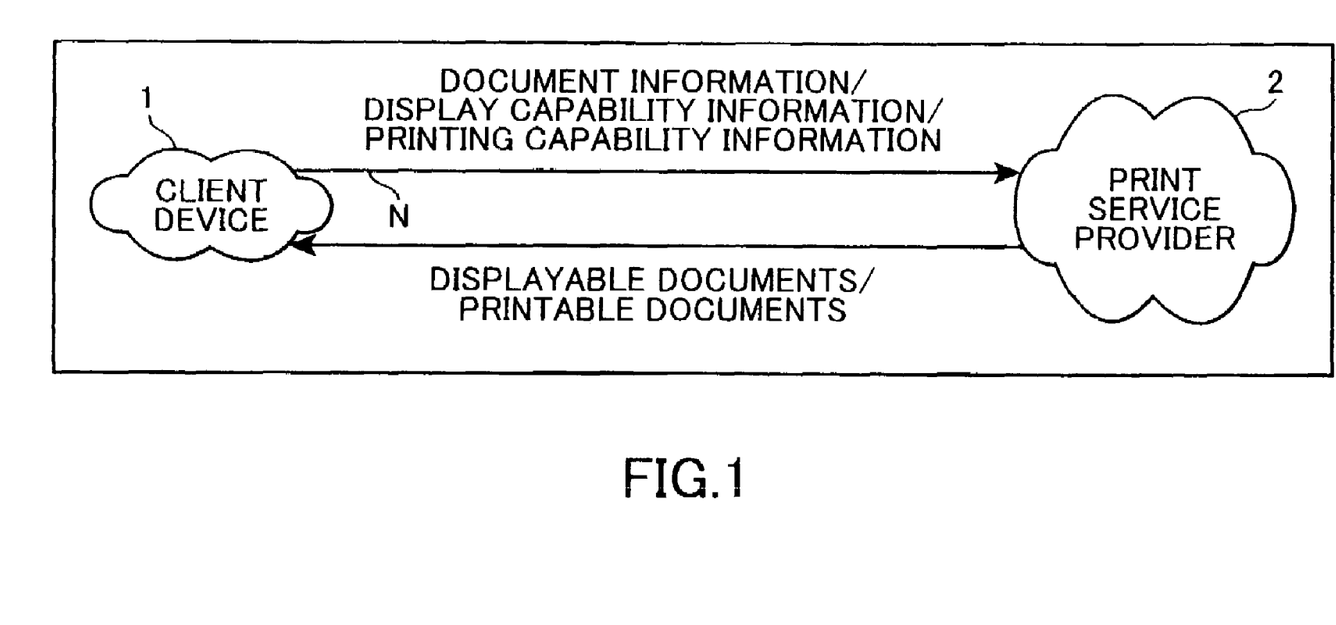
FIG. 1 is a schematic view representing overall configuration of a print service system according to an embodiment of the present invention.

FIG. 1 is a schematic view representing overall configuration of a print service system. As shown in FIG. 1, the system includes a client device 1 and a print service provider 2. The client device 1 is connected to the print service provider 2 by a network N. The client device 1 transmits information about documents that the operator of the client device 1 wants to view or print, about the display capability of the client device 1, and about printing capability of the client device 1 to the print service provider 2.

The print service provider 2 performs judgments based on the information from the client device 1, information stored in the print service provider 2, and status of the network N between the client device 1 and the print service provider 2 and, based on these judgments, transmits to the client device 1 displayable or printable documents or a converting module that enables the client device 1 to display and print documents.

Figure 2:
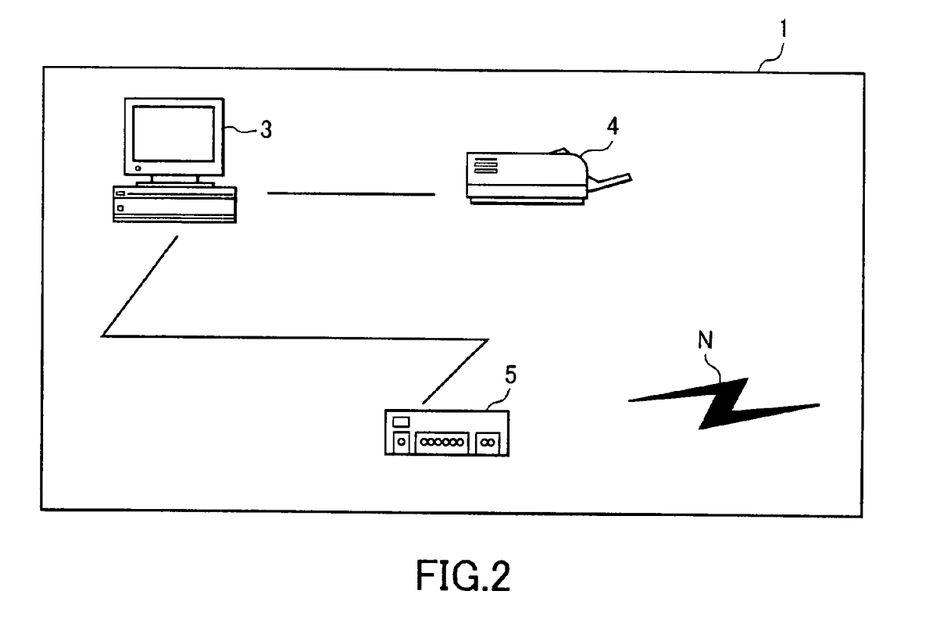
FIG. 2 is a schematic view representing configuration of client device of the system of FIG. 1.

Next, configuration of the print service system will be described. As shown in FIG. 2, the client device 1 includes a client-side computer 3 with a display screen 3a, a printer 4 for printing, and a network unit 5 for connecting to the network N.

The client-side computer 3 is provided with a variety of functions, including a function for producing data to transmit to the print service provider 2. The details of data transmitted to the print service provider 2 will be described later. The client-side computer 3 also includes a function for printing documents using the printer 4. Further, the client-side computer 3 includes functions for connecting to the network using the network unit 5 and performing other control operations required for using the print service provided by the print service provider 2.

Figure 3:
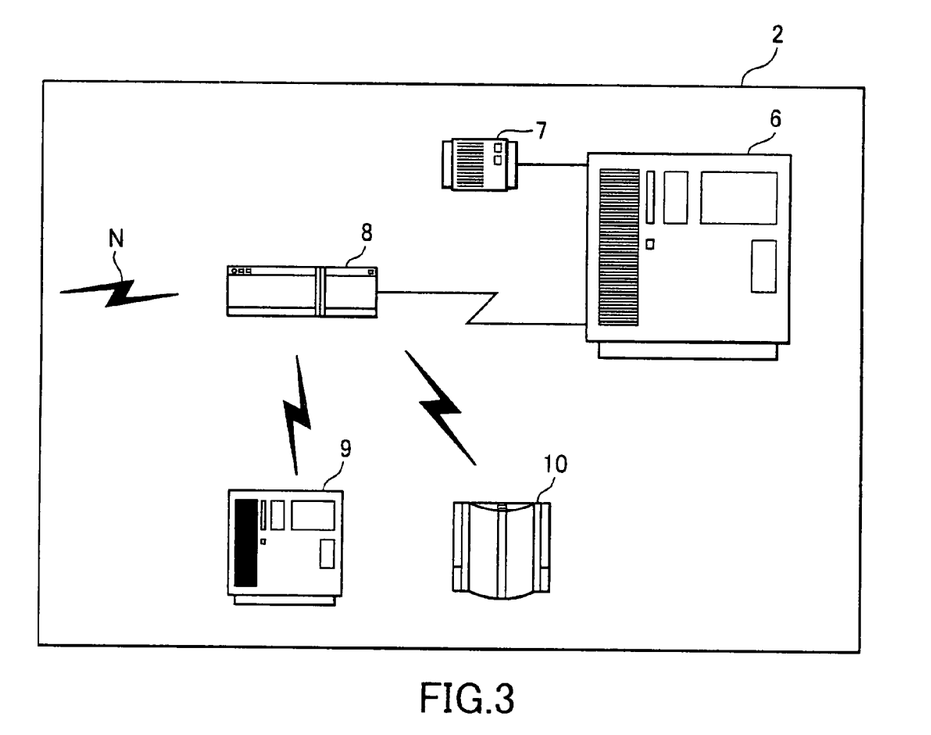
FIG. 3 is a schematic view representing configuration of provider of the system of FIG. 2.

The print service provider 2 includes a storage device 7 for storing various information, a network unit 8 for connecting to the network N, and a control device 6.

The control device 6 is the core of the print service provider 2. It controls the storage device 7 and performs operations for preparing data based on various information and for transmitting the data to the client device 1. Also, the control device 6 connects to a printer manufacturer database 9 and an application manufacturer database 10 through the network unit 8. The control device 6 regularly obtains information regarding applications and printers and stores the obtained information in the storage device 7. Because of this, the latest information regarding applications and printers can be obtained.

Next, a process performed by the print service provider 2 when the print service provider 2 receives data from the client device 1 will be described.

Figure 4:
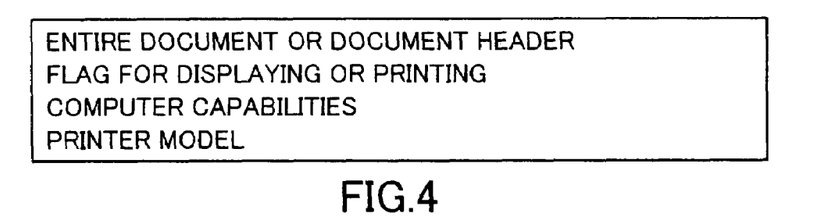
FIG. 4 is a view representing data format that the client device transmits to the provider.

FIG. 4 is a view representing data format that the client device 1 transmits to the print service provider 2. As shown in FIG. 4, the client device 1 transmits an entire document file or only the header part of the document file, a flag indicating how the client device 1 will process the document, that is, whether the document will be displayed or printed, information regarding the capability of the client-side computer 3, and information about the model of the printer 4 are transmitted to the print service provider 2.

Figure 5:
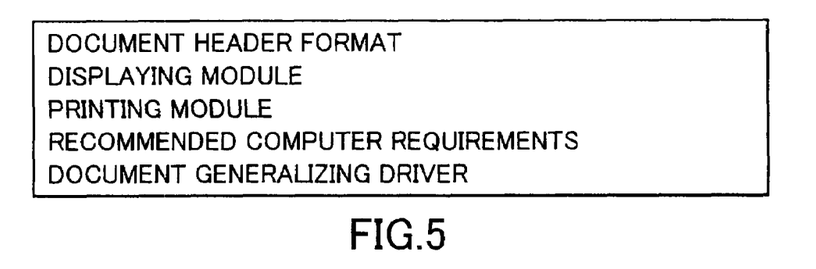
FIG. 5 is a view showing an example database stored in the storage device for a certain type of document preparing application software.

The storage device 7 of the print service provider 2 constructs a database including format data stored by document type. FIG. 5 is a view showing an example database stored in the storage device 7 for a certain type of document preparing application software. As shown FIG. 5, the database includes header format of a document file prepared using the subject application software, the names of modules that can be used for displaying and printing a document of this type, hardware requirements for a computer to display and print such a document, and the name of a driver that converts documents into a general-purpose display form, such as HTML or XML. In addition to this database, the storage device 7 of the print service provider 2 constructs a database storing printer drivers of various printers.

Figure 6:
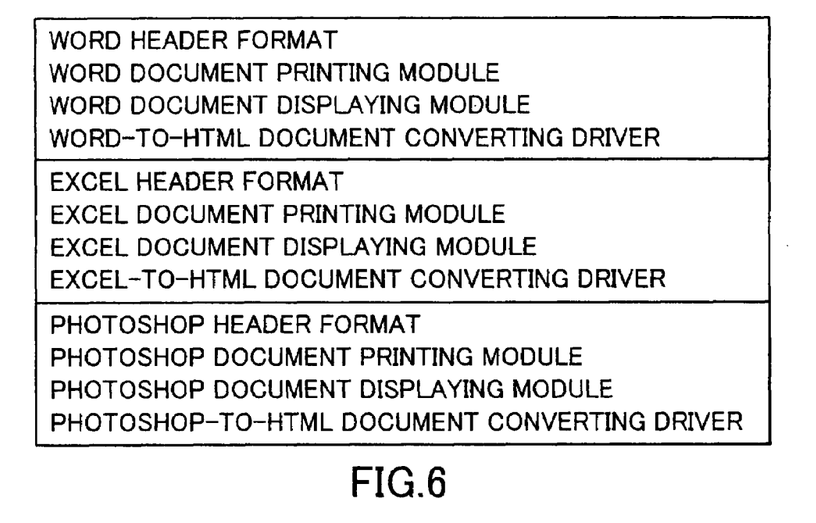
FIG. 6 is a view representing an example document database constructed in the provider.
Figure 7:
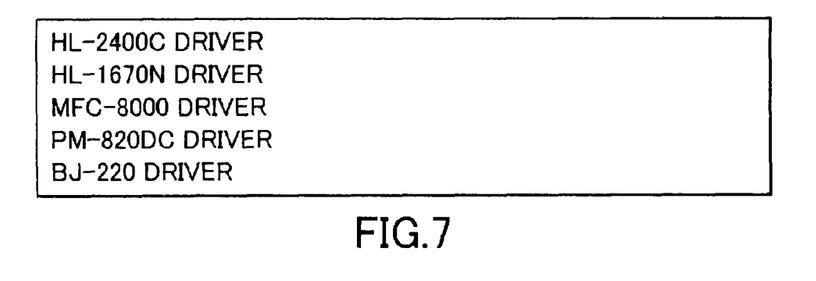
FIG. 7 is a view showing an example printer database constructed in the provider.

Next, examples of how the print service provider system operates will be described. According to a first example, the storage device 7 of the print service provider 2 stores the document database shown in FIG. 6 and the printer driver database shown FIG. 7. That is, as shown in FIG. 6, the storage device 7 stores information regarding documents produced by Word™, Excel™, and PhotoShop™. As shown in FIG. 7, the storage device 7 also stores information regarding five kinds of printer drivers. The client-side computer 3 includes an Intel 468DX, 66 MHz Processor and 16 Mbytes of memory. The model number of the printer 4 connected to the client-side computer 3 is HL-1670N.

In the following example, the client-side computer 3 uses the print service provider 2 to print out a document, "Sample. Doc", that was produced using Word™ software. In order to use the print service provided by the print service provider 2, the client device 1 needs to execute a print service connection application program to connect with the print service provider 2. This application program must be installed in the client-side computer 3 in advance, so it can be executed.

Figure 8:
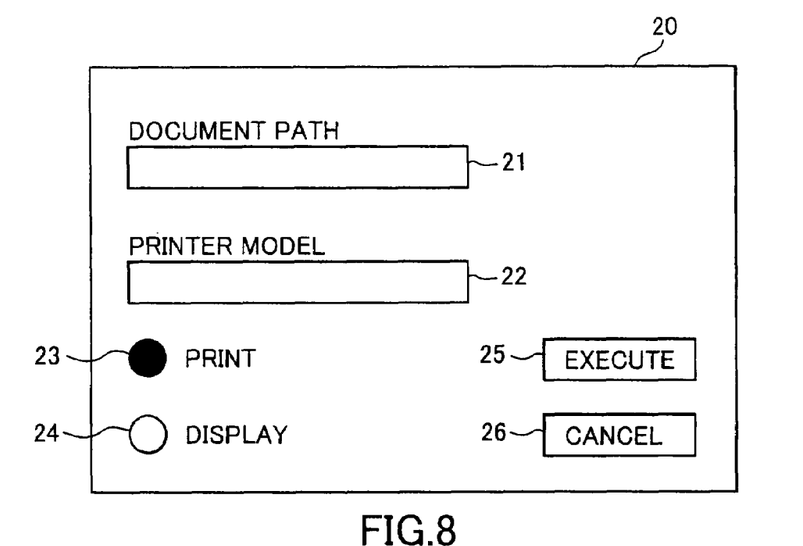
FIG. 8 is a view showing an example user interface 20 displayed in the client-side computer.

When the operator of the client device 1 selects the print service connection application so that the client-side computer 3 executes the print service connection application, the client-side computer 3 displays a user interface 20 on the display 3a as shown in FIG. 8. The user interface 20 includes a document path input space 21 and a printer data input space 22. The operator inputs the document file name into the document path input space 21 and the name of the printer that will be used to print the document into the printer data input space 22. The operator can additionally input the drive name into the document path input space 21 to better indicate the location of the document data. Below the spaces 21, 22, the user interface 20 includes a print button 23, which the operator selects when printing is the desired process, and a display button 24, which the operator selects when displaying is the desired process. The user interface 20 further includes an execution button 25, which the operator selects to transmit inputted or selected contents, and a cancellation button 26, which the operator selects to cancel inputted or selected contents in order to input new data.

Figure 9:
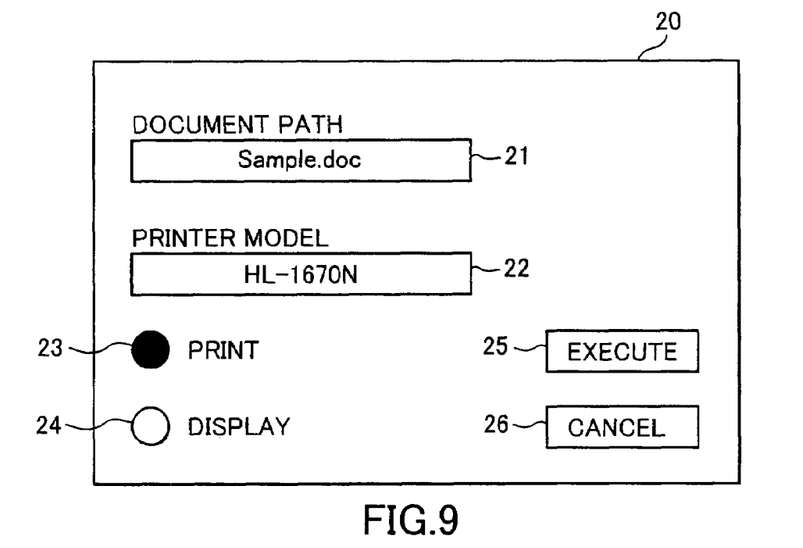
FIG. 9 is a view showing the interface of FIG. 8 inputted with first example that the client-side computer uses the print service provider to print out a document, "Sample. Doc"

As described above, in this example the operator of the client device 1 wishes to print out "Sample. doc", which is a Word™ document, using a HL-1670N printer. Therefore, as shown in FIG. 9, the operator inputs "Sample. doc" in the document path input space 21, and "HL-1670N" in the printer data input space 22. Then, the operator selects the print button 23 and presses the execution button 25.

Figure 10:
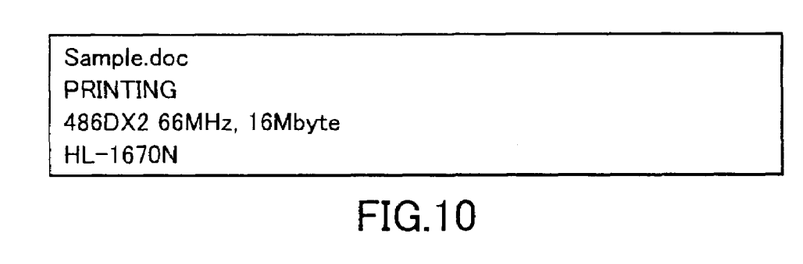
FIG. 10 is a view showing the data format of FIG. 4 with first example of data that the client device transmits to the provider.

As a result, the print service connection application program of the client-side computer 3 prepares data shown in FIG. 10 and transmits it to the print service provider 2 through the network unit 5. That is, as shown in FIG. 10, the print service connection program transmits data of the "Sample. doc" document, a flag indicating "printing" as the desired process, the capabilities of the client-side computer 3, that is, an Intel 486DX, 66 HZ processor and 16 Mbytes of memory, and the model of the printer, that is, "HL-1670N".

Next, operations performed by the print service provider 2 will be described while referring to FIGS. 3, 11 and 12. When the control device 6 receives this data, then, in step 001, the control device 6 recognizes from the document header that the "Sample. doc" document is in Word™ format and determines that it should refer to the database regarding Word™ format documents.

Next, in step 002, the control device 6 determines from the received data that the operator of the client device 1 wishes to print out the document and so in step 004 prepares response data for enabling the client device 1 to print out the "Sample. doc" document.

Next, operations for preparing the response data will be described. As shown in FIG. 12, in step 005, the control device 6 of the provide equipment 2 judges whether or not there is text of the document in the response data. Because the print service provider 2 received the entire "Sample doc" document in this example (step 005: yes), in step 006 the control device 6 judges whether or not the client-side computer 3 has sufficient resources. To make the judgement of step 006, the control device 6 refers to information about Word™ format documents in the document database shown in FIG. 6. The capability information in the example shown in FIG. 6 recommends a Pentium™ processor 100 MHz and 32 Mbytes memory as sufficient for processing Word™ format documents. The control device 6 compares the capability information in the database with the capabilities of the client-side computer 3 according to the received data. As a result, the control device 6 recognizes that the client-side computer 3 has insufficient resources to process the "Sample.doc" document (step 006: No).

In this case, in step 008, the control device 6 converts the data of the "Sample. doc" into a format that the client-side computer 3 can print out as is using the printer 4. That is, the control device 6 recognizes from the received data that the model of the printer 4 is "HL-1670N" and so reads out the printer driver for HL-1670N printers from the printer driver database shown in FIG. 7. The control device 6 uses the HL-1670N printer driver to convert the "Sample. doc" document into data that the printer 4 can print out as is and transmits this data in a response to the client device 1.

Once the client device 1 receives this converted data of the "Sample.doc" document from the print service provider 2, the client-side computer 3 can use it to print out the "Sample. doc" document using the HL-1670N printer 4 that is connected to the client-side computer 3. In this way, even though the client-side computer 3 has insufficient capability to process the document in a desired way, the client-side computer 3 can reliably execute processes desired by the operator.

Next, processes of a second example will be described. In this example, the client-side computer 3 in the client device 1 is provided with an Intel Pentium™, 233 MHz processor and 64 Mbytes of memory. The printer 4 of the client device 1 is an HL-2400C model printer that is connected to the client-side computer 3. Other conditions are the same as the first example.

In the same way as in the first example, the client device 1 first executes the provider service connection application program that is used for using the print service provider 2. Then, the operator of the client device 1 inputs data into the user interface 20 as shown in FIG. 13.

Figure 13:
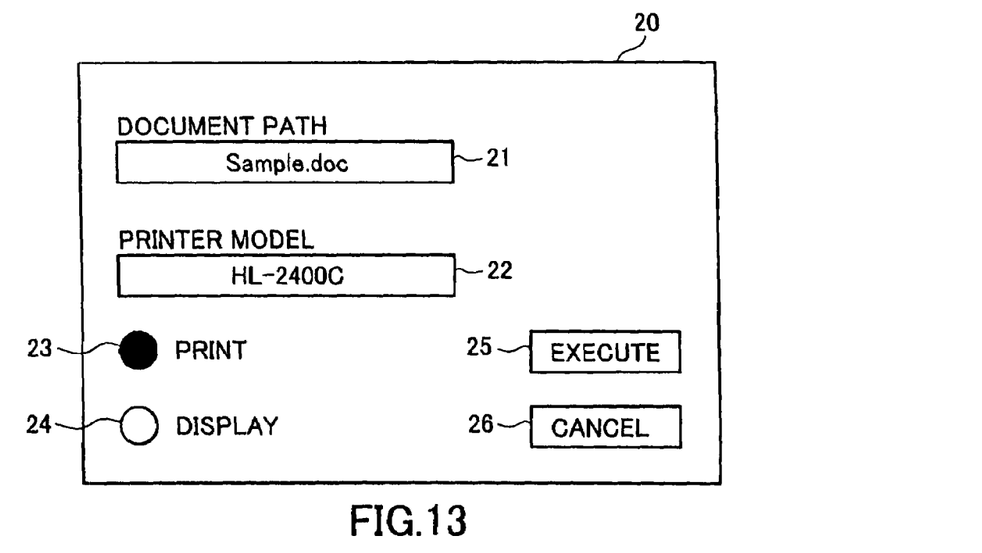
FIG. 13 is a view showing the interface of FIG. 8 inputted with second example that the client-side computer uses the print service provider to print out a document, "Sample. Doc"

That is, as shown in FIG. 13, the document path input space 21 is inputted with "Sample.doc" and the printer data input space 22 is inputted with "HL-2400C". Then, the operator selects the print button 23 and presses the execution button 25.

Figure 14:
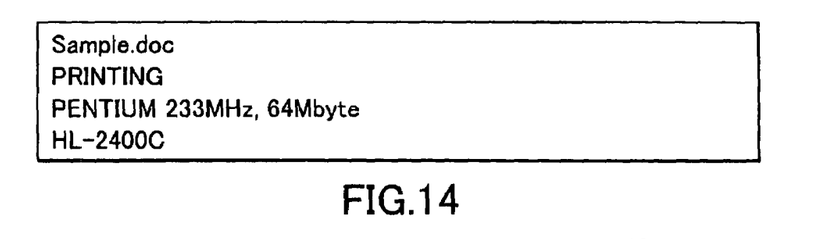
FIG. 14 is a view showing the data format of FIG. 4 with second example of data that the client device transmits to the provider.

As a result, the service provider connection application program prepares the data shown in FIG. 14, and transmits the data to the print service provider 2 through the network unit 5. That is, as shown in FIG. 14, the program transmits data for the "Sample.doc" document, a flag indicating "printing" as a desired process, the capabilities of the client-side computer 3 as an Intel Pentium™, 233 MHz processor and 64 Mbytes of memory, and the printer model "HL-2400C".

When the control device 6 of the print service provider 2 receives this data from the client device 1, the control device 6 recognizes from the document header that the received document is in Word™ format and so in step 001 determines to refer to the database regarding Word™ format documents.

Next, in step 002 the control device 6 judges from the received data that the operator wishes to print the document and in step 004 transmits its data for printing the "Sample.doc" document in a response to the client device 1.

When preparing the response data, the control device 6 of the print service provider 2 judges in step 005 whether or not the received data contained the actual text of the "Sample.doc" document. In this example, the control device 6 received the entire "Sample.doc" document (step 005), so the control device 6 next judges in step 006 whether or not resources of the client-side computer 3 are sufficient. At this time, the control device 6 refers to information on the Word™ format documents in the document database shown in FIG. 6. In the example shown in FIG. 6, the document database recommends capability of an Intel Pentium™ processor 100 MHz and 32 Mbytes of memory as sufficient capabilities for processing Word™ format documents. Then, the control device 6 compares the obtained capability information and the capability provided in the received data for the client-side computer 3. As a result, the control device 6 judges in step 006 that the client-side computer 3 has sufficient capability to process the document.

In this case, in step 007 the control device 6 performs processes to prepare a module necessary for the client-side computer 3 to print out Word™ format documents.

In this process, the control device 6 reads out the name of the Word™ document printing module from the Word™ format document database shown in FIG. 6 and reads out the printing module that corresponds to the name from the storage device 7. Then, the control device 6 prepares the printing module and transmits the printing module as response data to the client device 1.

The client device 1 receives this response data, and then prints out the "Sample.doc" document using the received printing module and the HL-2400C printer driver already installed in the client-side computer 3. In this way, when the client-side computer 3 meets requirements for processing the document, the process desired by the operator can be achieved by transmitting the necessary module to the client device 1.

Next, a third example will be provided. As in the second example, the client-side computer 3 of the client device 1 is provided with an Intel Pentium™ 233 MHz processor and 64 Mbytes of memory. The printer 4 of the client device 1 is an HL-2400C model printer. In this example, the operator of the client device 1 wishes to view a "Large.psd" document that is in PhotoShop™ format.

First, in the same manner as in the second embodiment, the client device 1 executes the service provider connection application program for using the print service provider 2. Then the operator of the client device 1 inputs data in the user interface 20 as shown in FIG. 15.

Figure 15:
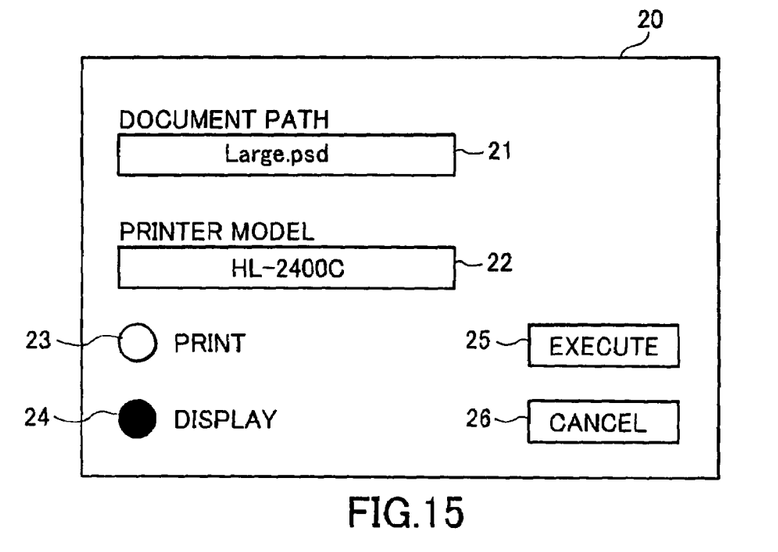
FIG. 15 is a view showing the interface of FIG. 8 inputted with third example that the operator of the client device wishes to view a "Large.psd" document that is in Photo-Shop™ format.

That is, as shown FIG. 15, the document path input space 21 is inputted with "Large.psd" and the printer model input space 22 is inputted with "HL-2400C". Then, the display button 24 is selected and the execution button 25 is pressed.

Figure 16:
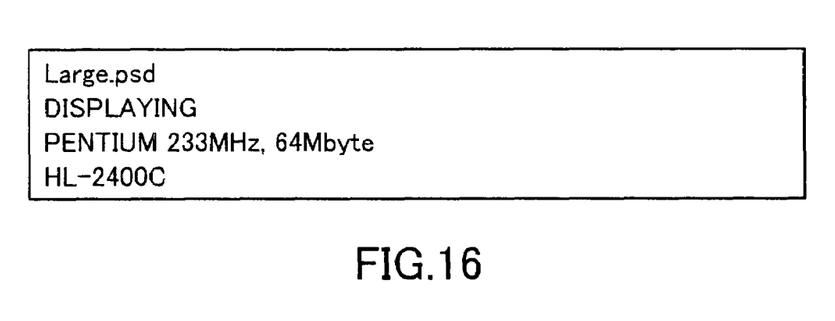
FIG. 16 is a view showing the data format of FIG. 4 with third example of data that the client device transmits to the provider.

As a result, the application program prepares the data shown in FIG. 16 and transmits the data to the print service provider 2 through the network unit 5. That is, as shown in FIG. 16 the application program transmits the document "Large.psd", a flag indicating "displaying" as the desired process, the capabilities of the client-side computer 3 as being an Intel Pentium™ 233 MHz CPU and 64 Mbytes of memory, and the model of the printer as being "HL-2400C".

Figure 11:
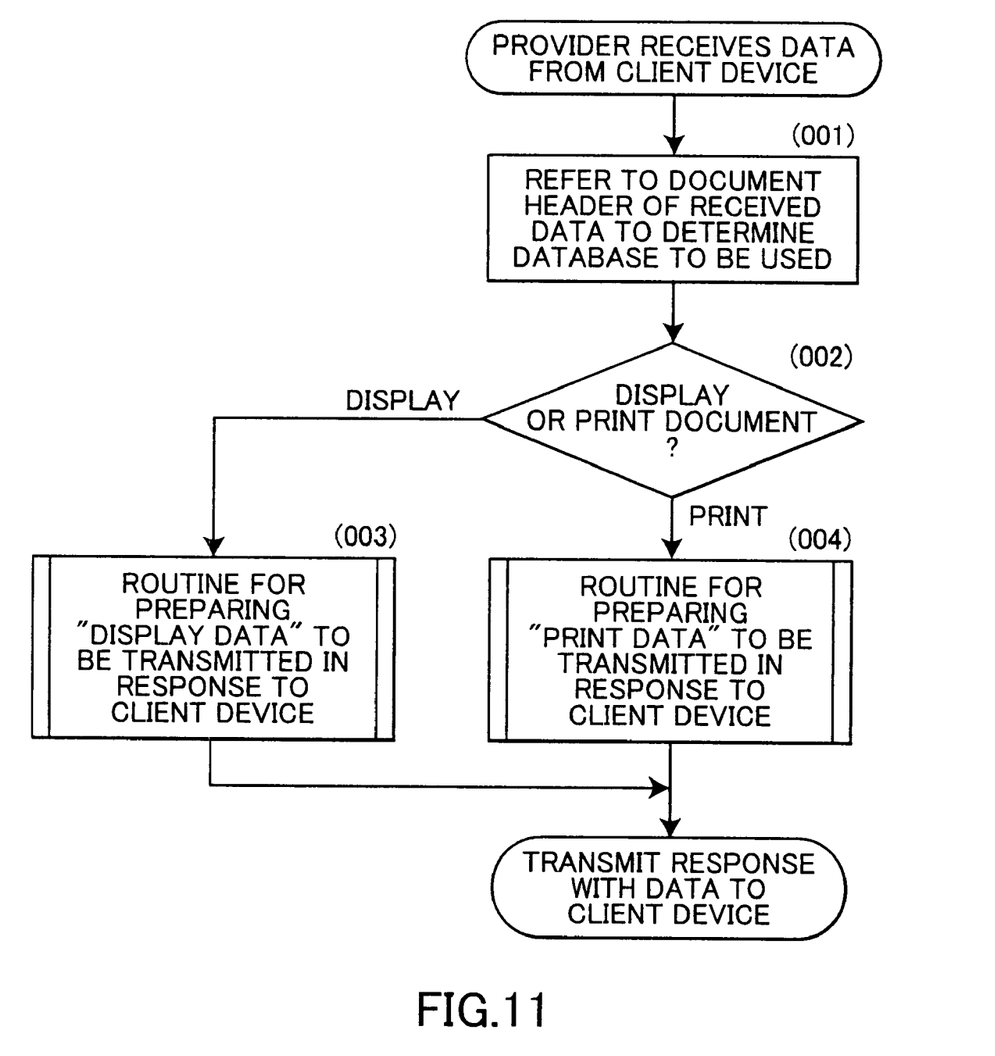
FIG. 11 is a flowchart showing operations performed by the provider.

In step 001 of the flowchart of FIG. 11, the control device 6 in the print service provider 2 receives this data and recognizes the document header to be PhotoShop™ format, and so determines to refer to the database of PhotoShop™ format documents.

Next, in step 002 the control device 6 recognizes from the received data that the process desired by the operator of the client device 1 is to display the document, and so in step 003 prepares response data accordingly.

Figure 12:
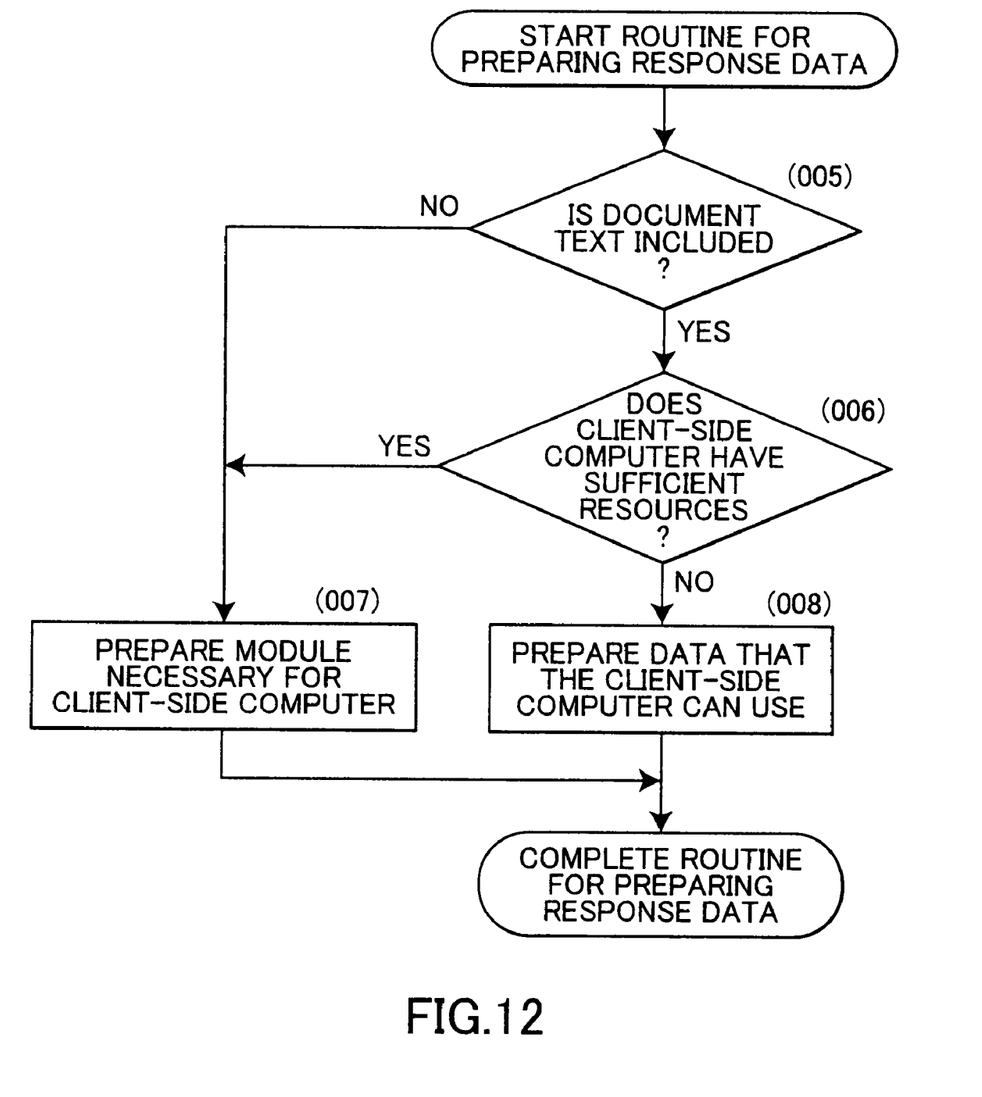
FIG. 12 is a flowchart showing routine for preparing response data.

When preparing the response data, the control device 6 of the print service provider 2 judges in step 005 of the flowchart of FIG. 12 whether or not the response data includes actual text of the document. Because the entire document "Large.psd" is received in this example (step 005: yes), the control device 6 next judges in step 006 whether or not the client-side computer 3 has sufficient resources. At this time, the control device 6 refers to the document database shown in FIG. 6 for information regarding the PhotoShop™ format documents. In the example shown in FIG. 6, the document database indicates a Pentium™ II 266 MHz processor and 128 Mbytes of memory as required for processing documents that are in PhotoShop™ format. Then, the control device 6 compares the obtained information and the capabilities of the computer indicated in the received data. As a result, the client-side computer is recognized not to meet the minimum requirements for processing PhotoShop™ format document (step 006: no).

In this case, in step 008 of FIG. 12 the control device 6 prepares document data that the client-side computer 3 can display. During this preparation operation, the control device 6 refers to PhotoShop documents generalizing driver indicated in the document database shown in the FIG. 6. In the example shown in FIG. 6, the PhotoShop document generalizing driver is a driver for converting PhotoShop documents into HTML format. The control device 6 reads out the driver for converting to HTML format from the storage device 7 and, by using the driver for converting to HTML format, converts the data that can be displayed by any WWW browser normally provided in computers. Then, this data is transmitted to the client device 1.

Accordingly, the client device 1 that received this data can process the PhotoShop™ format document "Large.psd" for display by using the WWW browser installed in the client-side computer 3, even if the client-side computer 3 is a low-performance computer.

In the above examples, the printer driver was pre-installed in the client-side computer 3. However, the print service provider 2 can be designed to transmit a necessary printer driver to the client device 1 in situations where the client-side computer 3 is not installed with the printer driver, or the version of the printer driver is not up to date.

If the client device 1 consists of an independent printer connected directly to the network, then the print service provider 2 can transmit documents converted to printable data directly to the printer. In this case, the client device can dispense with sending the printer 4 a command for printing out received printable data.

Further, the print service provider 2 can be designed to compare the size of data in the module for printing or for displaying documents and of the printable or displayable data, and then transfer the smaller-sized data amount to the client device 1. This configuration can reduce network traffic.

Further, the client device 1 can be designed to transmit only the document header to the print service provider 2 when the operator attempts to send an extremely large document. Also, the client device 1 can be designed to make this judgement automatically. This can also reduce the network traffic.

XML may be used instead of or in addition to HTML as the format that can be displayed by the client device's web browser.

It should be noted that the above-described examples are not to be considered limitations to particular communication protocols that the client device 1 and the print service provider 2 must use. Data can be transmitted through a router, using HTTP and SMTP protocol. On the contrary, both the client device 1 and the print service provider 2 may be located in the same network under the jurisdiction of a single router.

The application program can be modified to automatically determine which printer will be used to print, rather than having this be selected by the operator of the client device 1.

Figure 17:
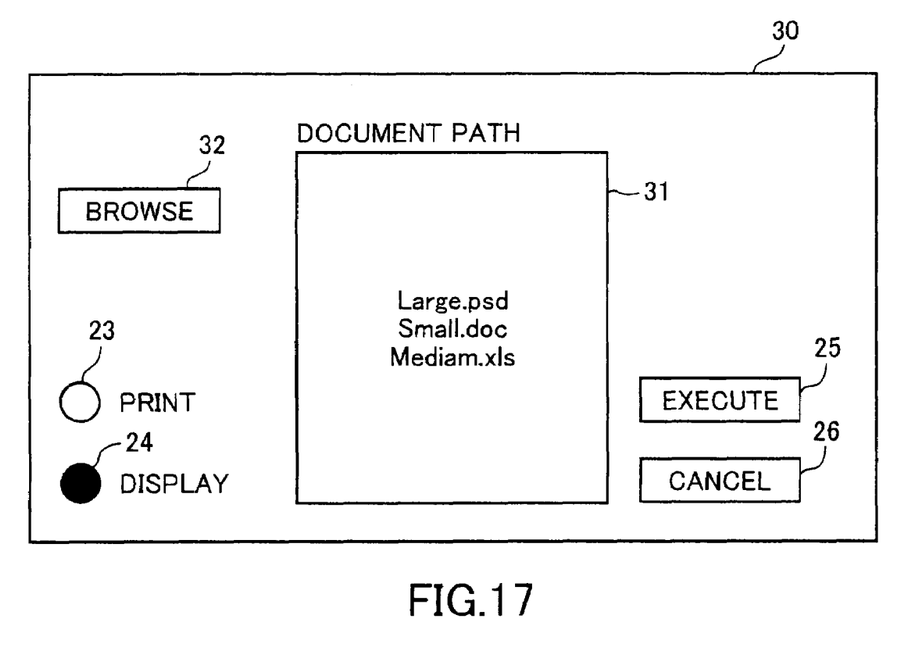
FIG. 17 is a view showing an example of the interface of FIG. 8 when transmitting a plurality of documents together.

Further, the system can be modified to enable an operator to choose to display or print a plurality of documents at the same time. In this case, for example, a user interface 30 can be configured as shown in FIG. 17 with a document paths input space 31 that the operator inputs with file data for a plurality of documents. Also, instead of inputting document names manually, file data may be browsed through in the manner of Windows™ Explorer by pressing a browser button 32 shown in FIG. 17. Also, documents may be chosen by dragging and dropping document file data into the document paths input space 31.

After the client device 1 receives the printable or displayable data, there is no need to maintain the corresponding pre-analyzed data in its memory because the printable data or displayable data can be used to perform the process desired by the operator. To avoid wasting memory, the client device 1 can be modified to automatically delete pre-analyzed data after printable or displayable data is received from the print service provider 2.

In the above-described examples, the client device 1 notified the print service provider 2 of printer type and computer capabilities of the client device 1. However, the present invention is not limited only to this configuration. The client device 1 needs only to notify the print service provider 2 of only information about documents. In this case, the print service provider 2 can prepare general purpose displayable or printable bitmap data and transmit the bitmap data to the client device 1.

According to the present invention, the operator of client device 1 can print or display documents easily and promptly even if the client device's computer is not installed with the necessary application software or is a low-performance computer.

What is claimed is:

1. A data analysis provider system, comprising:
  a client device and a data analysis provider being connected to each other through a network for a two-way transmission,
  the client device having a processing capability, the client device including:
    a target-of-analysis information transmission unit that transmits at least one of target-of-analysis data and information relating to the target-of-analysis data to the data analysis provider;
    a processing capability notification unit that notifies the data analysis provider about the processing capability; and
    a response data reception unit, and the data analysis provider including:
    a target-of-analysis information reception unit that receives the at least one of the target-of-analysis data and the information from the client device;
    a response unit that prepares response data that enables the client device to perform a desired process based on the target-of-analysis data; and
    a response data transmission unit that transmits the response data to the client device, wherein
  the response unit performs analysis of the processing capability, and prepares the response data according to the analysis, and
  the response data reception unit receives the response data from the data analysis provider.

2. The data analysis provider system as claimed in claim 1, wherein the target-of-analysis data is a document.

3. The data analysis provider system as claimed in claim 1, wherein
  the client device further includes a printing unit having a printing capability,
  the desired process is to print out the target-of-analysis data,
  the processing capability notification unit notifies the data analysis provider about the printing capability,
  the response unit generates print data based on the target-of-analysis data and the printing capability, the print data being in a form printable by the printing unit, and
  the response data transmission unit transmits the print data as the response data.

4. The data analysis provider system as claimed in claim 1, wherein the client device further comprises a memory that stores the target-of-analysis data.

5. The data analysis provider system as claimed in claim 1, wherein
  the client device further has a resource,
  the desired process is to display the target-of-analysis data,
  the processing capability notification unit notifies the data analysis provider about the resource, and
  the response unit generates display data based on the target-of-analysis data, the display data being in a form displayed using the resource, and
  the response data transmission unit transmits the display data as the response data.

6. The data analysis provider system as claimed in claim 1, wherein
  the client device further includes a printing unit having a printing capability,
  the desired process is to print out the target-of-analysis data,
  the processing capability notification unit notifies the data analysis provider about the printing capability,
  the response unit prepares a conversion module based on the printing capability, the conversion module operating in the client device to convert the target-of-analysis data into a form printable by the printing unit, and
  the response data transmission unit transmits the conversion module as the response data.

7. The data analysis provider system as claimed in claim 1, wherein
  the client device having a resource,
  the desired process is to display the target-of-analysis data,
  the processing capability notification unit notifies the data analysis provider about the resource, and
  the response unit prepares a conversion module based on the resource, the conversion module operating in the client device to convert the target-of-analysis data into a form that is displayed by the resource at the client device, and the response data transmission unit transmits the conversion module as the response data.

8. The data analysis provider system as claimed in claim 1, wherein
the client device further includes a printing unit having a printing capability,
the processing capability notification unit notifies the data analysis provider about the printing capability, and
the response unit determines on the basis of the printing capability whether print data or a conversion module should be prepared, the print data being in a form printable by the printing unit, the conversion module operating in the client device to convert the target-of-analysis data into a form recognizable by the printing unit, and then prepares one of the print data and the conversion module based on the determination, and
the response transmission unit transmits the prepared one of the print data and the conversion module.

9. The data analysis provider system as claimed in claim 1, wherein
the client device has a resource,
the desired process is to display the target-of-analysis data;
the processing capability notification unit notifies the data analysis provider about the resource, and
the response unit determines on the basis of the resource whether display data or a conversion module should be prepared, the display data being in a form displayed by the resource, the conversion module operating in the client device to convert the target-of-analysis data into the form displayed by the resource at the client device, and then prepares one of the display data and the conversion module based on the determination, and
the response transmission unit transmits the prepared one of the display data and the conversion module.

10. The data analysis provider system as claimed in claim 1, wherein:
the target-of-analysis information transmission unit transmits header information of the target-of-analysis data; and
the response unit confirms characteristics of the target-of-analysis data by analyzing the header information.

11. The data analysis provider system as claimed in claim 1, wherein
the client device has a software capability,
the target-of-analysis information transmission unit is capable of transmitting the software capability to the data analysis provider, and
the response unit confirms the software capability.

12. A data analysis provider communicating with a client device through a network bi-directionality, the client device having a processing capability, comprising:
a target-of-analysis information reception unit that receives the processing capability and at least one of target-of-analysis data and information relating to the target-of-analysis data transmitted from the client device;
a response unit that prepares response data that enables the client device to perform a desired process based on the target-of-analysis data; and
a response data transmission unit that transmits the response data to the client device, wherein
the response unit performs analysis of the processing capability for the desired process, and prepares the response data according to the analysis.

13. The data analysis provider as claimed in claim 12, wherein the target-of-analysis data is a document.

14. The data analysis provider as claimed in claim 12, wherein
the target-of-analysis information reception unit receives a printing capability from the client device,
the response unit prepares print data based on the target-of-analysis data and the printing capability, the print data being in a form printable by the client device, and
the response data transmission unit transmits the print data as response data.

15. The data analysis provider as claimed in claim 12, wherein
the target-of-analysis information reception unit receives a notice about a resource of the client device,
the response unit generates display data based on the target-of-analysis data and the resource, the display data being in a form displayed using the resource, and
the response data transmission unit transmits the display data as response data.

16. The data analysis provider as claimed in claim 12, wherein
the target-of-analysis information reception unit receives a printing capability of the client device,
the response unit prepares a conversion module based on the target-of-analysis data and the printing capability, the conversion module operating in the client device to convert the target-of-analysis data into a form printable by the client device, and
the response data transmission unit transmits the conversion module as response data.

17. The data analysis provider as claimed in claim 12, wherein
the target-of-analysis information reception unit receives a notice about a resource of the client device,
the response unit prepares a conversion module based on the resource, the conversion module operating in the client device to convert the target-of-analysis data into a form that can be displayed by the resource, and
the response data transmission unit transmits the conversion module as response data.

18. The data analysis provider as claimed in claim 12, wherein the response unit determines based on a printing capability of the client device whether print data or a conversion module should be prepared, the print data being in a form printable by the client device, the conversion module operating in the client device to convert the target-of-analysis data into the form printable by the client device, and then prepares one of the print data and the conversion module based on the determination, and
the response data transmission unit transmits the prepared one of the print data and the conversion module as the response data.

19. The data analysis provider as claimed in claim 12, wherein the response unit determines based on a resource of the client device whether display data or a conversion module should be prepared, the display data being in a form displayed by the resource, the conversion module operating in the client device to convert the target-of-analysis data into the form displayed by the resource, and then prepares one of the display data and the conversion module based on the determination, and
the response data transmission unit transmits the prepared one of the print data and the conversion module as the response data.

20. The data analysis provider as claimed in claim 12, wherein the response unit confirms characteristics of the target-of-analysis data by analyzing header information transmitted from the client device.

21. A data analysis provider communicating with a client device through a network bi-directionally, the client device being a printer having a printing capability, comprising:
- a target-of-analysis information reception unit that receives the printing capability and at least one of target-of-analysis data and information relating to the target-of-analysis data transmitted from the client device;
- a response unit that prepares response data that enables the printer to print the target-of-analysis data by using the printing capability; and
- a response data transmission unit that transmits the response data to the client device, wherein
- the response unit performs analysis of the printing capability for the desired process, and prepares the response data according to the analysis.

22. A client device communicating with a data analysis provider through a network and bi-directionally, the client device having a processing capability, comprising
- a target-of-analysis information transmission unit that transmits at least one of target-of-analysis data and information relating to the target-of-analysis data to the data analysis provider;
- a processing capability notification unit that notifies the data analysis provider about the processing capability; and
- a response data reception unit that receives response data for performing a desired process based on the target-of-analysis data, the response data being prepared according to analysis of the processing capability by the data analysis provider.

23. A method of analyzing target-of-analysis data in a client device provided in a system including a data analysis provider, the client device having a process capability, the method comprising:
- transmitting the process capability and at least one of the target-of-analysis data and information relating to the target-of-analysis data to the data analysis provider;
- performing analysis of the processing capability and a processing capability required for a desired process to be performed on the target-of-analysis data;
- preparing for response data based on the analysis, the response data enabling the client device to perform the desired process; and
- transmitting the response data from the data analysis provider to the client device.

24. A computer program recorded on a computer readable recording medium, executable by a computer, comprising:
- instructions for analyzing target-of-analysis data in a host, the computer program comprising:
- instructions for transmitting a process capability of a terminal and at least one of target-of-analysis data and information relating to the target-of-analysis data to a host;
- instructions for performing analysis of the processing capability and a processing capability required for a desired process to be performed on the target-of-analysis data;
- instructions for generating response data based on the analysis, the response data enabling the terminal to perform the desired process; and
- instructions for transmitting the response data from the host to the terminal.

25. A computer readable storage medium storing a program executed by a computer for analyzing target-of-analysis data in a terminal of a system including the terminal and a host, the terminal having a process capability, the program comprising:
- instructions for transmitting the process capability and at least one of the target-of-analysis data and information relating to the target-of-analysis data to the host;
- instructions for performing analysis of the processing capability and a processing capability required for a desired process to be performed on the target-of-analysis data;
- instructions for generating response data at the host, the response data enabling the terminal to perform the desired process on the target-of-analysis data, the response data being prepared according to the analysis of the processing capability of the terminal; and
- instructions for transmitting the response data from the host to the terminal.

* * * * *